United States Patent [19]

New

[11] Patent Number: 4,858,045

[45] Date of Patent: Aug. 15, 1989

[54] MAGNETIC DISK LOCK HAVING BRAKING APPARATUS

[75] Inventor: Jimmie D. New, Arlington, Tex.

[73] Assignee: Xerox Corporation, Stamford, Conn.

[21] Appl. No.: 560,057

[22] Filed: Dec. 9, 1983

[51] Int. Cl.[4] .............................................. G11B 5/016
[52] U.S. Cl. .................................. 360/99.12; 360/99.08
[58] Field of Search ................... 360/97, 99, 133, 137

[56] References Cited

U.S. PATENT DOCUMENTS

| | | | |
|---|---|---|---|
| 3,735,843 | 5/1973 | Wiig | 188/72.1 |
| 3,838,755 | 10/1974 | Cochran et al. | 188/166 |
| 4,103,763 | 8/1978 | Glockner et al. | 192/2 |
| 4,208,682 | 6/1980 | Bryer | 360/99 |
| 4,331,989 | 5/1982 | Viskochil | 360/97 |
| 4,385,333 | 5/1983 | Hasler | 360/97 |

FOREIGN PATENT DOCUMENTS

| | | | |
|---|---|---|---|
| 57-98161 | 6/1982 | Japan | 360/97 |
| 0001868 | 1/1983 | Japan | 360/97 |

OTHER PUBLICATIONS

Pierson, D. L., IBM Technical Disclosure Bulletin, vol. 21, No. 12 (May 1979), pp. 4965–4968.

Primary Examiner—Robert S. Tupper
Assistant Examiner—Melissa J. Koval
Attorney, Agent, or Firm—Robert E. Cunha

[57] ABSTRACT

A magnetic disc drive brake assembly which automatically locks the disc drive when it is removed from its case. As the disc drive is lifted, a spring is released, which spring forces a brake pad into contact with the disc drive hub, thus locking the disc drive in place. Reversing the process automatically releases the disc drive.

2 Claims, 1 Drawing Sheet

MAGNETIC DISK LOCK HAVING BRAKING APPARATUS

This invention relates generally to magnetic disc drives, and more specifically the invention relates to a magnetic disc drive of the Winchester type having an improved braking device.

As is well known, inadvertent rotation of the disc drive during drive installation or removal can seriously damage the disc and/or drive mechanism. Various devices are known in the prior art for locking the disc drives against rotation. In one design, the disc drive had first to be removed from its case and a locking bar and screw installed. Other locking devices are shown in U.S. Pat. Nos. 4,331,989 to Stephen R. Viskochil and 4,385,333 to Alfred Hasler. These systems are relatively complex.

The present invention provides a brake apparatus of relatively inexpensive structure, and which provides for the automatic locking and unlocking of the disc drive mechanism upon removal and insertion, respectively, of the disc drive in its case.

The invention will be more readily understood by a reading of the detailed description taken in conjunction with the drawing which shows one embodiment of the present invention and in which.

Figure 1:
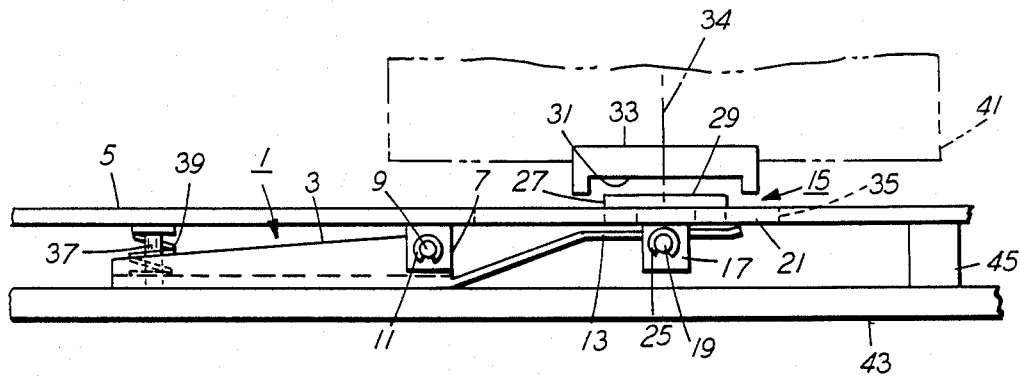
FIG. 1 is a side view of the disc drive brake mechanism of this invention showing the brake in the disc release position.

Referring now to the Figures, there is shown brake mechanism generally designated 1 which comprises a lever 3 mounted for rotation on disc drive base 5 by means of tabs 7 formed in disc drive base 5. Pin 9 passes through tabs 7 and lever 3 such that lever 3 is free to rotate around the long axis of pin 9. Pin 9 is conveniently held in place in tabs 7 and c clamps 11.

Lever 3 includes tongue portion 13. Mounted for rotation on tongue portion 13 is disc brake pad assembly generally designated 15. Tongue portion 13 is provided with tabs 17, which rotatably support pin 19. Brake pad assembly base 21 has tabs 23 formed thereon for rotatably mounting on pin 19. Pin 19 is held in place in tabs 17, 23 by c clamps 25. A disc brake pad 27, having a high friction surfac 29, is bonded to brake pad assembly base 21. A similar high friction surface 31 is formed on disc drive hub 33.

An aperture 35 is formed in disc drive base 5 to allow passage of the brake pad assembly 15 through disc drive base 5 as lever 3 rotates on pin 9. Also formed in disc drive base 5 is post 37. Post 37 is provided to keep spring 39 in place. Post 37 is long enough to maintain spring 39 in place but is short enough not to interfere with the rotation of lever 3 around pin 9 to the locking position.

Figure 2:
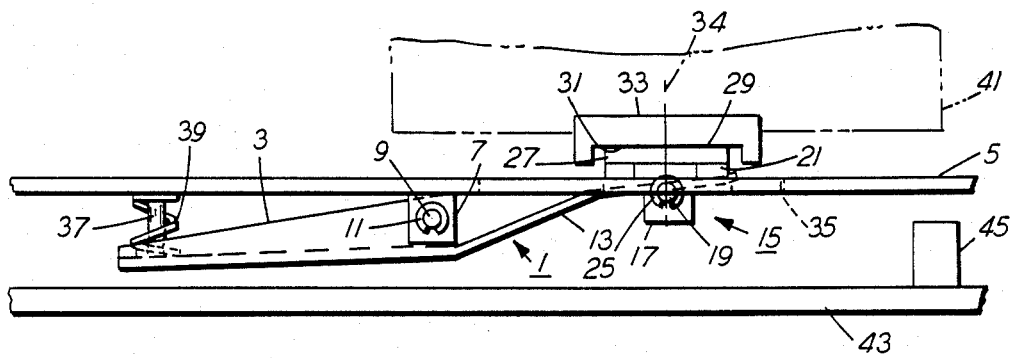
FIG. 2 is a side view of the disc drive brake mechanism of this invention showing the brake in the disc lock position.
Figure 3:
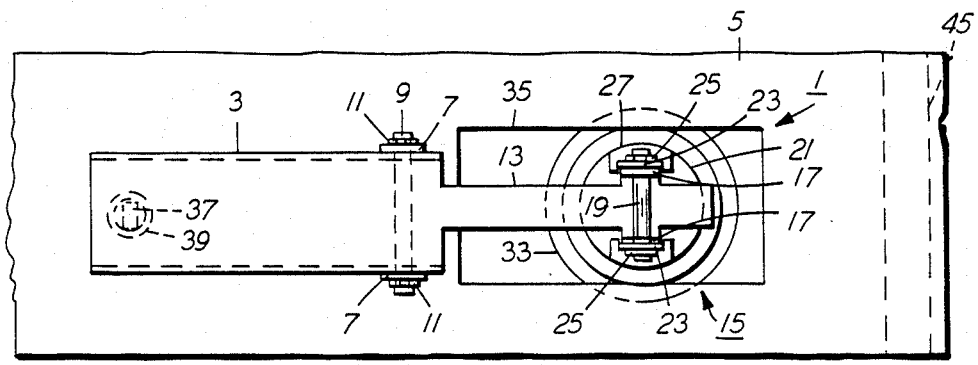
FIG. 3 is a bottom view of the disc drive brake mechanism of this invention.

Disc drive hub 33 is connected to disc drive motor 41 shown in broken line in FIGS. 1 and 2 only. Disc drive hub 33 rotates around axis of rotation 34. The disc drive is contained in a case, the base 43 of which is shown in FIGS. 1 and 2. Case base 43 has one or more support members 45 formed thereon to support disc drive base 5.

Referring to FIG. 1, in operation, when the disc drive is in its case, disc drive base 5 is supported by support member 45 and by lever 3. In this position, the weight of the disc drive has compressed spring 39 causing lever 3 to rotate clockwise as shown in the drawing, thus moving disc brake pad 27 out of contact with disc drive hub 33. This is the normal operational position of the disc drive and disc drive brake 1.

Referring now to FIG. 2, when it is desired to remove the disc drive from its case for maintenance or other reasons, the operator lifts the disc drive out of the case. As the disc drive base 5 is moved away from case base 43, the weight of the disc drive is removed from brake mechanism 1. This allows spring 39 to expand causing rotation of lever 3 counterclockwise, as shown in FIG. 2, around pin 9. The counterclockwise movement of lever 3 forces tongue 13 to move disc brake pad assembly 15 into contact with disc drive hub 33. The movement is in a direction parallel to the axis of rotation 34 of disc drive hub 33. The strength of spring 39, combined with the presence of high friction surfaces 29, 31, firmly locks disc drive hub 33 in place preventing rotation of the disc drive hub 33 and thus of the disc drive to which it is attached. It can be seen that the brake is applied automatically as soon as disc drive base 5 is moved away from case base 43 far enough to allow spring 39 to rotate the brake pad 27 into contact with the disc drive hub 33. It can also be seen that by placing the disc drive back in the case, the brake pad 27 automatically is moved away from disc drive hub 33 as soon as the weight applied to spring 39 is sufficient to cause rotation of disc brake pad assembly 15 away from disc drive hub 33.

The disc brake pad assembly 15 is mounted for rotation around pin 19 so that as the disc brake pad 27 is brought into contact with disc drive hub 33, high friction surfaces 29, 31 will be parallel and thus be in full contact with each other.

While the invention has been described in reference to a single preferred embodiment, the description is illustrative of the invention and is not to be construed as limiting the invention. Various modifications and applications may occur to those skilled in the art without departing from the true spirit and scope of the invention as defined by the appended claims. For example, the brake mechanism could be provided on a separate plate and the plate bolted to the base of a disc drive if desired.

What is claimed is:

1. A disc drive brake for automatically locking a disc drive when the drive is lifted from its case, comprising
    a lever rotatably connected to said disc drive, the point of rotating connection between said lever and said drive being relatively close to the center of said lever so that a first end of said lever will be forced into an upper position by said case when said drive is in its case, and will be allowed to drop into a lower position when said drive is lifted from its case,
    a spring positioned between said drive and said first end of said lever which forces said first end of said lever into its lower position when said drive is lifted from its case, and is compressed by contact with said case when said drive is set into its case and said first end of said lever is forced into its upper position, and
    a brake pad mounted on the second end of said lever, and positioned such that when said first end of said lever is in its lower position and said second end of said lever is in its upper position said pad will contact a portion of the bottom surface of the drive that is adapted to rotate when the disk drive is operating.

2. The brake of claim 1 further comprising a rotatable connection between said pad and said lever, the axis of rotation being horizontal and perpendicular to the length of said lever, to allow the top of the brake pad to contact the rotating portion of the drive over said pad's entire top surface.

* * * * *